(12) United States Patent
Hayakawa

(10) Patent No.: US 9,399,460 B2
(45) Date of Patent: Jul. 26, 2016

(54) CONTROL SYSTEM FOR VEHICLE

(71) Applicant: Yuki Hayakawa, Okazaki (JP)

(72) Inventor: Yuki Hayakawa, Okazaki (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/652,289

(22) PCT Filed: Jan. 16, 2013

(86) PCT No.: PCT/JP2013/050656
§ 371 (c)(1),
(2) Date: Jun. 15, 2015

(87) PCT Pub. No.: WO2014/112049
PCT Pub. Date: Jul. 24, 2014

(65) Prior Publication Data
US 2015/0344024 A1  Dec. 3, 2015

(51) Int. Cl.
| | |
|---|---|
| *G06F 7/00* | (2006.01) |
| *B60W 20/00* | (2016.01) |
| *B60W 10/04* | (2006.01) |
| *B60K 6/445* | (2007.10) |
| *B60W 10/10* | (2012.01) |
| *F16H 61/02* | (2006.01) |
| *B60W 10/105* | (2012.01) |
| *B60W 30/18* | (2012.01) |

(52) U.S. Cl.
CPC ............... *B60W 20/30* (2013.01); *B60K 6/445* (2013.01); *B60W 10/04* (2013.01); *B60W 10/10* (2013.01); *B60W 10/105* (2013.01); *B60W 20/00* (2013.01); *B60W 30/18072* (2013.01); *F16H 61/02* (2013.01); *B60W 2540/06* (2013.01); *B60W 2720/106* (2013.01); *Y02T 10/6239* (2013.01)

(58) Field of Classification Search
CPC ........ B60W 20/30; B60W 10/10; B60W 10/04
See application file for complete search history.

(56) References Cited

U.S. PATENT DOCUMENTS

| | | | | |
|---|---|---|---|---|
| 2001/0039230 A1* | 11/2001 | Severinsky | ............ | B60H 1/004 477/3 |
| 2006/0015231 A1* | 1/2006 | Yoshimura | ............... | B60K 6/46 701/48 |

(Continued)

FOREIGN PATENT DOCUMENTS

| | | |
|---|---|---|
| JP | H04-290663 A | 10/1992 |
| JP | H07-016058 U | 3/1995 |
| JP | 2004-092623 A | 3/2004 |

(Continued)

OTHER PUBLICATIONS

International Search Report issued Apr. 16, 2013, in PCT/JP2013/050656, filed Jan. 16, 2013.

*Primary Examiner* — David J Hlavka
(74) *Attorney, Agent, or Firm* — Oblon, McClelland, Maier & Neustadt, L.L.P.

(57) ABSTRACT

A control system for a vehicle capable of changing a deceleration by changing a shift range, includes: a PM-ECU for controlling a powertrain of the vehicle; and a start switch operated by a driver to start and stop the PM-ECU. When the start switch is operated during travel of the vehicle, the PM-ECU stops control of the powertrain. When the PM-ECU stops control of the powertrain and thereafter the start switch is operated again during travel of the vehicle, the PM-ECU controls the shift range in accordance with an elapsed time since the PM-ECU stopped control of the powertrain.

6 Claims, 10 Drawing Sheets

(56) References Cited

U.S. PATENT DOCUMENTS

| | | | | |
|---|---|---|---|---|
| 2012/0172175 A1* | 7/2012 | Nedorezov | ............ | F02D 41/065 477/169 |
| 2013/0009769 A1* | 1/2013 | Saito | ........................ | B60Q 1/22 340/466 |
| 2014/0148987 A1* | 5/2014 | Otsubo | .................. | B60K 6/445 701/22 |
| 2015/0038296 A1* | 2/2015 | Toyota | .................. | B60W 20/00 477/92 |
| 2015/0149016 A1* | 5/2015 | Saitoh | .................... | B60K 6/485 701/22 |

FOREIGN PATENT DOCUMENTS

| | | |
|---|---|---|
| JP | 2007-187031 A | 7/2007 |
| JP | 2012-218697 A | 11/2012 |

* cited by examiner

CONTROL SYSTEM FOR VEHICLE

TECHNICAL FIELD

The present invention relates to a control system for a vehicle. The present invention particularly relates to, in a vehicle capable of changing a deceleration by changing a shift range, a technique of controlling the shift range when performing the stop operation by a control device and thereafter performing the restart operation during travel.

BACKGROUND ART

An ECU (Electronic Control Unit) has been used as an electronic control device that controls a powertrain and the like mounted on a vehicle. For example, the ECU is started when a driver turns on an ignition switch (or a start switch), and is stopped when the driver turns off the ignition switch. Even during travel of the vehicle, the ECU can be stopped (including a state in which power supply to auxiliary equipment is possible, while only control of the powertrain is stopped) by turning off the ignition switch. In addition, after the ECU is stopped, the ECU can be restarted (control can be resumed) by turning on the ignition switch during travel.

When the ECU is restarted, an engine that was stopped due to the stop of the ECU can also be started up again during travel, by using the technique described in Japanese Patent Laying-Open No. 2004-92623 (PTD 1). According to the technique described in Japanese Patent Laying-Open No. 2004-92623, an automatic transmission enters a neutral state when the engine is started up, and after the engine is started up, the automatic transmission returns to a state in which a gear for forward travel is automatically selected.

CITATION LIST

Patent Document

PTD 1: Japanese Patent Laying-Open No. 2004-92623

SUMMARY OF INVENTION

Technical Problem

However, if the gear is automatically selected, the gear may differ before and after the engine is started up, due to a difference in vehicle speed before and after the engine is started up. Therefore, the deceleration of the vehicle may vary. Therefore, the deceleration expected by the driver cannot be obtained in some cases.

The present invention has been made in light of the aforementioned problem and an object thereof is to achieve the deceleration expected by the driver.

Solution to Problem

In the invention according to claim 1, a control system for a vehicle capable of changing a deceleration by changing a shift range, includes: a control device for controlling a powertrain of the vehicle; and a switch operated by a driver to start and stop the control device. When the switch is operated during travel of the vehicle, the control device stops control of the powertrain. When the control device stops control of the powertrain and thereafter the switch is operated again during travel of the vehicle, the control device controls the shift range in accordance with an elapsed time since the control device stopped control of the powertrain.

It is conceivable that the driver desires a deceleration equivalent to a deceleration when the control device stopped control of the powertrain, as the elapsed time since the control device stopped control of the powertrain becomes shorter. It is also conceivable that the driver becomes accustomed to the current traveling condition and desires a deceleration corresponding to this traveling condition, as the elapsed time since the control device stopped control of the powertrain becomes longer. Therefore, by controlling the shift range in accordance with the elapsed time since the control device stopped control of the powertrain, the deceleration desired by the driver can be achieved.

In the invention according to claim 2, when the elapsed time is longer than or equal to a prescribed time period, the control device selects a shift range in accordance with a traveling condition of the vehicle. When the elapsed time is shorter than the prescribed time period, the control device selects the same shift range as the shift range when the control device stopped control of the powertrain.

When the driver becomes accustomed to the current traveling condition of the vehicle, the shift range appropriate for this traveling condition is selected. Before the driver becomes accustomed to the current traveling condition, the shift range when the control device stopped control of the powertrain is selected. Thus, the deceleration desired by the driver can be achieved.

In the invention according to claim 3, when the elapsed time is longer than or equal to a prescribed time period and when a brake pedal is not operated, the control device selects a shift range in accordance with a traveling condition of the vehicle. When the elapsed time is longer than or equal to the prescribed time period and when the brake pedal is operated, the control device selects a shift range that allows a higher deceleration than a deceleration when the brake pedal is not operated. When the elapsed time is shorter than the prescribed time period, the control device selects the same shift range as the shift range when the control device stopped control of the powertrain.

When the driver becomes accustomed to the current traveling condition of the vehicle, the shift range appropriate for this traveling condition is selected. Before the driver becomes accustomed to the current traveling condition, the shift range when the control device stopped control of the powertrain is selected. Thus, the deceleration desired by the driver can be achieved. In addition, when the driver becomes accustomed to the current traveling condition of the vehicle, the brake pedal is operated to make the deceleration high when the driver requests the higher deceleration. Thus, the deceleration can be made high in accordance with the driver's intention.

In the invention according to claim 4, when the control device stops control of the powertrain due to operation of the switch during travel of the vehicle, in a state where the powertrain is controlled in a manual shift mode in which the shift range can be manually changed, the control device controls the shift range in accordance with the elapsed time when the switch is operated again during travel of the vehicle.

In the manual shift mode, the driver expects to obtain a desired deceleration by arbitrarily changing the shift range. Therefore, by achieving the deceleration desired by the driver in such manual shift mode, the driver's request can be satisfied.

DESCRIPTION OF EMBODIMENTS

Figure 1:
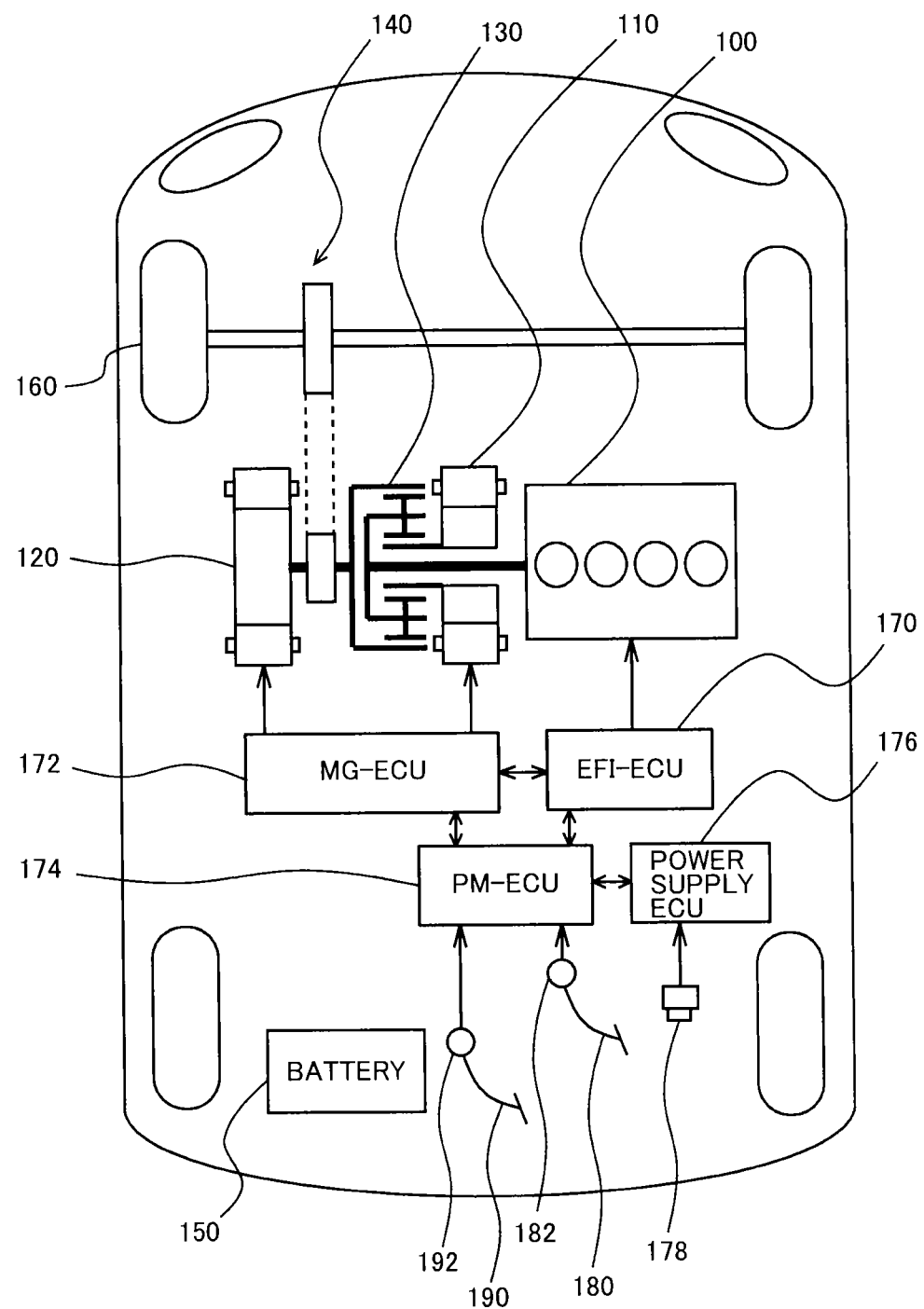
FIG. 1 is a schematic configuration diagram showing a hybrid vehicle.

Referring to figures, embodiments of the present invention will be described below. In the description below, the same components are given the same reference characters. Their names and functions are also the same. Hence, they will not be described in detail repeatedly.

Referring to FIG. 1, a hybrid vehicle includes an engine 100, a first motor generator 110, a second motor generator 120, a power split device 130, a speed reducer 140, and a battery 150. A powertrain of this vehicle includes engine 100, first motor generator 110 and second motor generator 120.

The hybrid vehicle travels using driving power provided from at least one of engine 100 and second motor generator 120. Instead of the hybrid vehicle, an electric vehicle or a fuel cell vehicle that travels using only driving power provided from a motor may be used. A vehicle having only an engine as a driving source may be used.

Engine 100, first motor generator 110 and second motor generator 120 are connected to one another via power split device 130. Motive power generated by engine 100 is split by power split device 130 into two paths. One of them is a path for driving front wheels 160 via speed reducer 140. The other is a path for driving first motor generator 110 to generate electric power.

First motor generator 110 is a three-phase alternating current rotating electric machine including a U-phase coil, a V-phase coil and a W-phase coil. First motor generator 110 generates electric power using the motive power generated by engine 100 and split by power split device 130. The electric power generated by first motor generator 110 is used depending on the traveling conditions of the vehicle and the SOC (State of Charge) of battery 150. For example, during normal traveling, the electric power generated by first motor generator 110 is used directly as electric power for driving second motor generator 120. On the other hand, when the SOC of battery 150 is lower than a predetermined value, the electric power generated by first motor generator 110 is stored in battery 150.

Second motor generator 120 is a three-phase alternating current rotating electric machine including a U-phase coil, a V-phase coil and a W-phase coil. Second motor generator 120 is driven using at least one of the electric power stored in battery 150 and the electric power generated by first motor generator 110.

The driving power generated by second motor generator 120 is transmitted to front wheels 160 via speed reducer 140. In this way, second motor generator 120 assists engine 100, or causes the vehicle to travel using the driving power provided from second motor generator 120. Instead of or in addition to front wheels 160, rear wheels may be driven.

Upon regenerative braking of the hybrid vehicle, front wheels 160 drive second motor generator 120 through speed reducer 140 and second motor generator 120 operates as a power generator. In this way, second motor generator 120 operates as a regenerative brake to convert the braking energy to electric power. The electric power thus generated by second motor generator 120 is stored in battery 150.

Power split device 130 is constituted by a planetary gear including a sun gear, a pinion gear, a carrier, and a ring gear. The pinion gear engages with the sun gear and the ring gear. The carrier rotatably supports the pinion gear. The sun gear is coupled to the rotation shaft of first motor generator 110. The carrier is coupled to the crankshaft of engine 100. The ring gear is coupled to the rotation shaft of second motor generator 120 and speed reducer 140.

Figure 2:
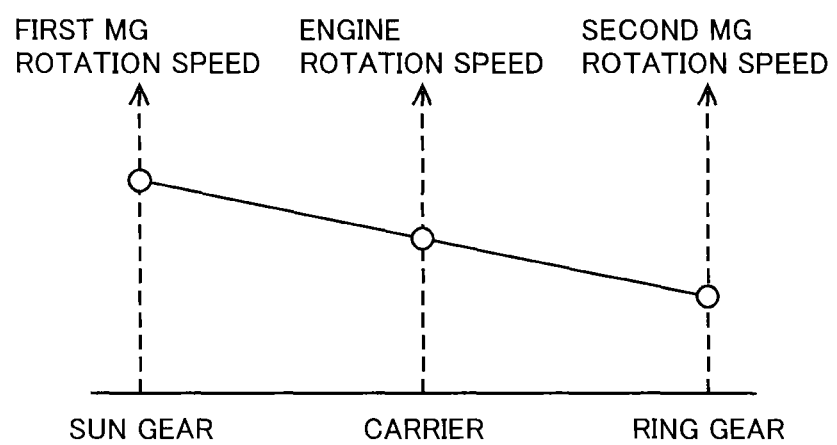
FIG. 2 shows a nomographic chart of a power split device.

Since engine 100, first motor generator 110 and second motor generator 120 are coupled to one another through power split device 130 constituted by the planetary gear, the rotation speeds of engine 100, first motor generator 110 and second motor generator 120 are in such a relation that they are connected by a straight line in a nomographic chart as shown in FIG. 2.

As is clear from the nomographic chart shown in FIG. 2, a ratio of the rotation speed of second motor generator 120 as an output rotation speed to the engine rotation speed as an input rotation speed can be changed in a stepless manner. Therefore, a hybrid system formed by engine 100, first motor generator 110, second motor generator 120, and power split device 130 is also referred to as "electrical continuously variable transmission".

Referring to FIG. 1 again, battery 150 is a battery pack constituted by a plurality of cells. Battery 150 is formed, for example, by connecting a plurality of battery modules in series, each of which has a plurality of cells incorporated therein. Battery 150 is, for example, a lithium ion battery. A voltage of battery 150 in the fully-charged state is, for example, approximately 200 V.

In the present embodiment, engine 100 is controlled by an EFI (Electronic Fuel Injection)-ECU 170. First motor generator 110 and second motor generator 120 are controlled by an MG (Motor Generator)-ECU 172. EFI-ECU 170 and MG-ECU 172 are connected to a PM (Power Train Manager)-ECU 174 to allow two-way communication.

PM-ECU 174 has a function of managing EFI-ECU 170 and MG-ECU 172. For example, start (power-on) and stop (power-off) of EFI-ECU 170 and MG-ECU 172 are controlled in accordance with a command signal from PM-ECU 174.

In addition, PM-ECU 174 provides commands about a target output, target torque and the like of engine 100 to EFI-ECU 170, and provides commands about the electric power generated by first motor generator 110, the electric power for driving second motor generator 120 and the like to MG-ECU 172. Therefore, PM-ECU 174 corresponds to a control device that controls the entire powertrain of the vehicle. By way of example, PM-ECU 174 determines driving torque of the vehicle in accordance with an amount of operation of an accelerator pedal 180 (also referred to as "accelerator opening degree") by the driver, and provides a command to EFI-ECU 170 and MG-ECU 172 such that the determined driving torque is achieved. The accelerator opening degree is detected by an accelerator opening degree sensor 182. Start and stop of PM-ECU 174 are managed by a power supply ECU 176.

In addition, by way of example, PM-ECU 174 determines a target deceleration of the vehicle in accordance with an amount of operation of a brake pedal 190 by the driver, and provides a command to EFI-ECU 170 and MG-ECU 172 such that the determined deceleration is achieved. As a result, in regenerative braking, for example, second motor generator 120 is controlled to produce the braking force that can achieve the determined deceleration. By way of example, the amount of operation of brake pedal 190 is detected by a position sensor 192.

Power supply ECU 176 determines whether or not the driver has operated a start switch 178, and generates an IG ON signal or an IG OFF signal in accordance with the driver's operation of start switch 178, and outputs the IG ON signal or the IG OFF signal to PM-ECU 174. By way of example, power supply ECU 176 determines whether or not the driver has operated start switch 178, based on a voltage that changes due to the driver's operation of start switch 178. A common method for determining whether or not a switch has been operated may be used as a method for determining whether or not the driver has operated start switch 178, and thus, detailed description thereof will not be repeated here.

In the present embodiment, by way of example, when the driver operates start switch 178 in a state where PM-ECU 174 is in the stop state, power supply ECU 176 generates the IG ON signal. When receiving the IG ON signal from power supply ECU 176, PM-ECU 174 is started.

Figure 3:
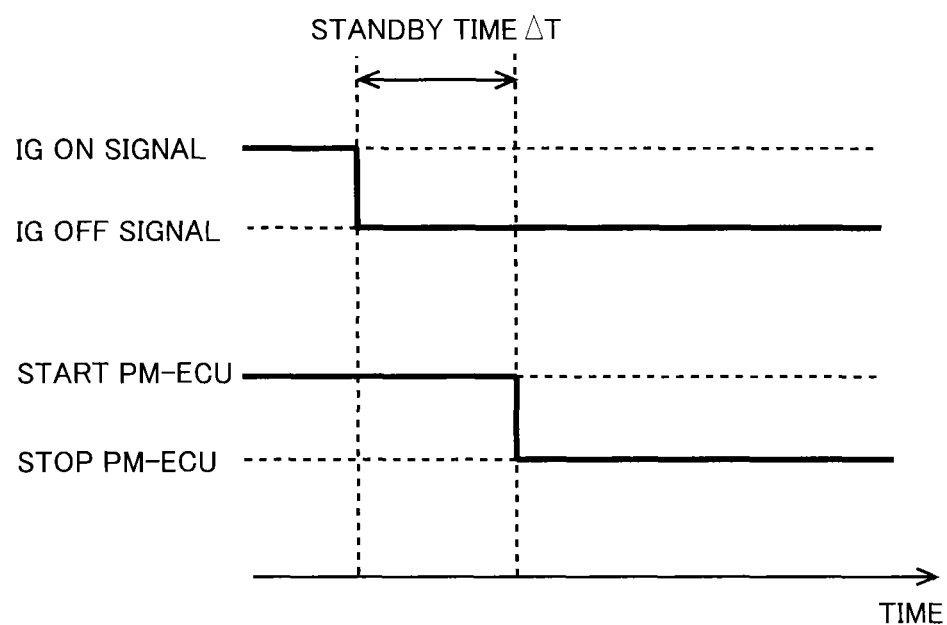
FIG. 3 shows a standby time ΔT until a PM-ECU stops.

On the other hand, when the driver operates start switch 178 in a state where PM-ECU 174 is in the activated state, power supply ECU 176 generates the IG OFF signal. As shown in FIG. 3, PM-ECU 174 maintains the activated state over a time period during which input of the IG OFF signal from power supply ECU 176 continues for a prescribed standby time ΔT, and is stopped when input of the IG OFF signal from power supply ECU 176 continues for prescribed standby time ΔT or longer.

In the present embodiment, even during travel of the vehicle, PM-ECU 174 can be stopped and started due to the driver's operation of start switch 178. However, when the IG OFF signal is inputted from power supply ECU 176 due to the driver's operation of start switch 178 during travel of the vehicle, PM-ECU 174 is not completely stopped but stops only control of the powertrain, and shifts to a state in which power supply to auxiliary equipment is possible (accessory ON). When the IG ON signal is inputted from power supply ECU 176 in this state due to the driver's operation of start switch 178 during travel of the vehicle, PM-ECU 174 resumes control of the powertrain.

Figure 4:
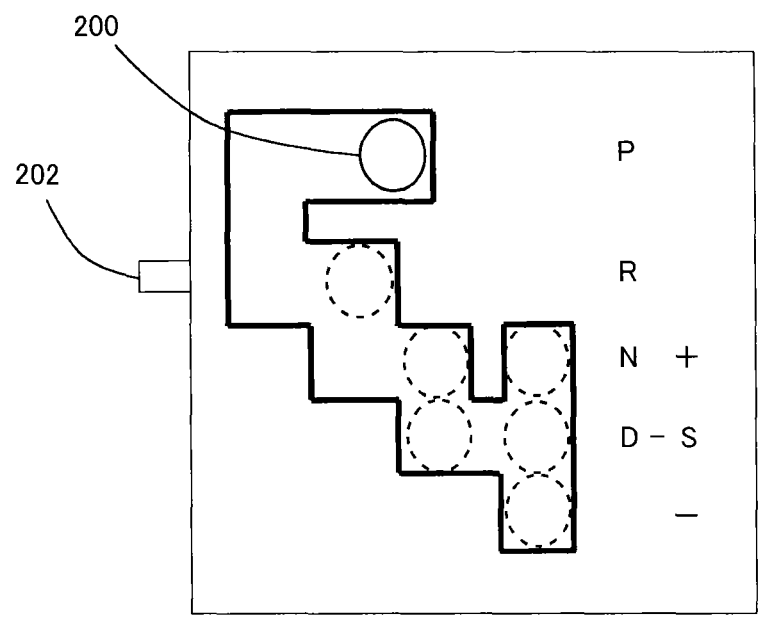
FIG. 4 shows a shift lever and shift positions.

The control mode of engine 100, first motor generator 110 and second motor generator 120 will be described with reference to FIG. 4. In the present embodiment, the control mode of engine 100, first motor generator 110 and second motor generator 120 is selected in accordance with operation of a shift lever 200 by the driver. As shown in FIG. 4, shift lever 200 moves along a shift gate. The control mode is selected in accordance with a position PSH of shift lever 200.

Position PSH of shift lever 200 is detected by a position sensor 202. Position sensor 202 determines whether a contact point provided at a position corresponding to a shift position is ON or OFF, thereby detecting position PSH of shift lever 200.

When position PSH of shift lever 200 is a "parking (P)" position or an "N (neutral)" position, engine 100, first motor generator 110 and second motor generator 120 are controlled such that the vehicle does not have driving power. In this case, control itself over engine 100, first motor generator 110 and second motor generator 120 may be stopped.

When position PSH of shift lever 200 is a "reverse (R)" position, engine 100, first motor generator 110 and second motor generator 120 are controlled such that the vehicle travels rearward with larger driving power as the amount of operation of accelerator pedal 180 becomes larger. More specifically, control is performed such that engine 100 is stopped and the vehicle travels rearward using only second motor generator 120 as a driving source.

When position PSH of shift lever 200 is a "drive (D)" position, the automatic shift mode is selected. In the automatic shift mode, engine 100, first motor generator 110 and second motor generator 120 are controlled such that the vehicle travels forward with larger driving power as the amount of operation of the accelerator pedal becomes larger.

More specifically, when the driver's request can be satisfied even if only second motor generator 120 is used as a driving source, such as at the time of the start of the vehicle, at the time of low vehicle speed, and at the time of light load, control is performed such that engine 100 is stopped and the vehicle travels forward using only second motor generator 120 as a driving source.

In the traveling state in which the efficiency of engine 100 is good, engine 100 starts up. In this case, control is performed such that the vehicle travels forward using engine 100 as a main driving source.

During acceleration, the driving power of the vehicle is secured by using engine 100 as a driving source, and first motor generator 110 generates electric power by using a part of the motive power of engine 100. Furthermore, the electric power generated by first motor generator 110 is used to drive second motor generator 120 as a driving source, and the driving power of second motor generator 120 is added to the driving power of engine 100.

When the SOC of battery 150 decreases, the driving power of the vehicle is secured by using engine 100 as a driving source, and first motor generator 110 generates electric power by using a part of the motive power of engine 100.

As described above, when position PSH of shift lever 200 is the "drive (D)" position, engine 100 is driven or stopped depending on the traveling conditions of the vehicle, and thus, engine 100 is operated intermittently.

Figure 5:
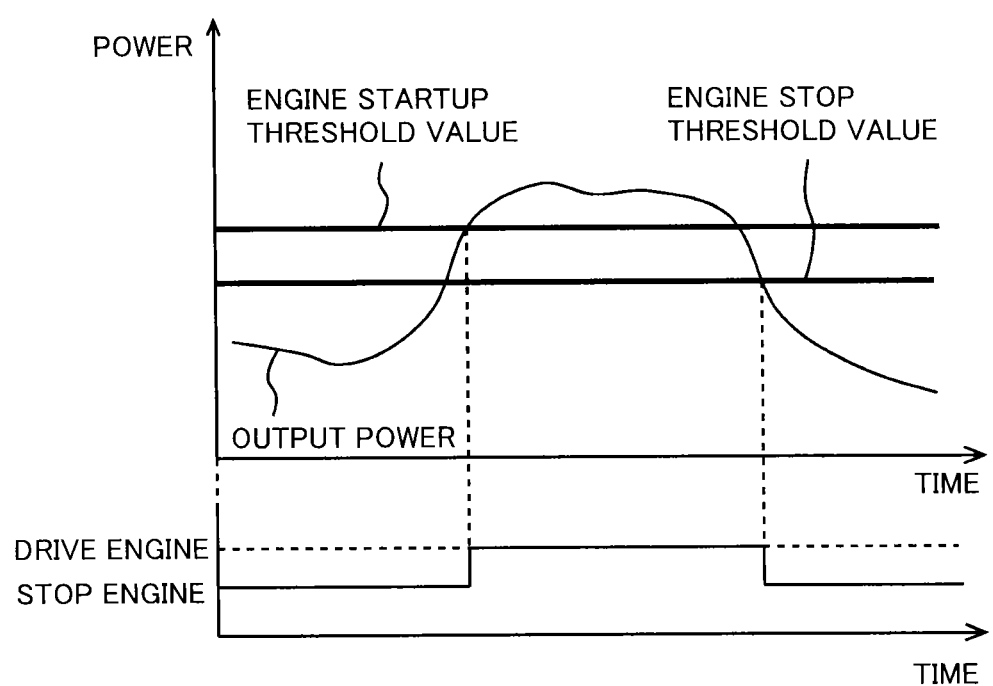
FIG. 5 shows a time period during which an engine is driven and a time period during which the engine is stopped.

The manner of controlling engine 100 in the automatic shift mode will be further described with reference to FIG. 5. As shown in FIG. 5, when the output power of the hybrid vehicle is smaller than an engine startup threshold value, the hybrid vehicle travels using only the driving power of second motor generator 120.

The output power is set as power used for causing the hybrid vehicle to travel. The output power is calculated by PM-ECU 174 in accordance with, for example, a map having the accelerator opening degree, the vehicle speed and the like as parameters. A method for calculating the output power is not limited thereto. The torque, the acceleration, the driving power, the accelerator opening degree and the like may be used instead of the output power.

When the output power of the hybrid vehicle becomes equal to or larger than the engine startup threshold value, engine 100 is driven. As a result, the hybrid vehicle travels using the driving power of engine 100 in addition to or instead of the driving power of second motor generator 120. In addition, the electric power generated by first motor generator 110 using the driving power of engine 100 is directly supplied to second motor generator 120.

Figure 6:
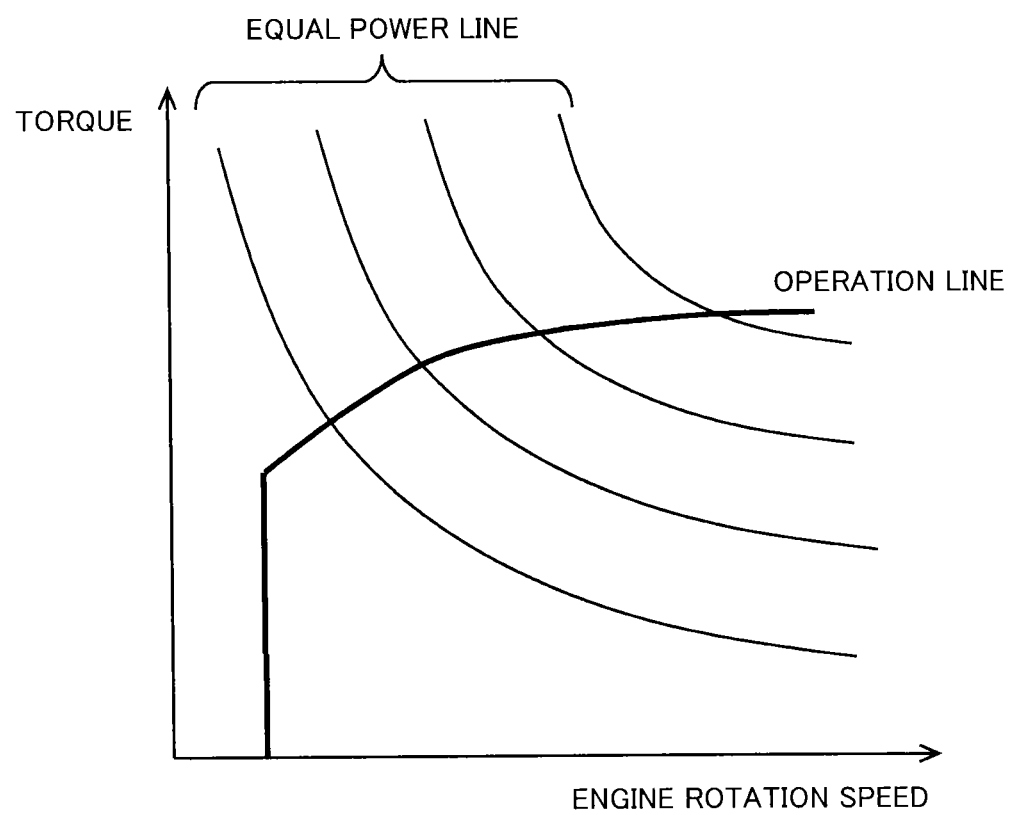
FIG. 6 shows an operation line of the engine.

As shown in FIG. 6, the operating point of engine 100, i.e., engine rotation speed NE and output torque TE are defined by an intersection of the output power and the operation line.

The output power is indicated by an equal power line. The operation line is preset by a developer based on experimental and simulation results. The operation line is set such that engine 100 can be driven to optimize (minimize) the fuel consumption. In other words, the optimum fuel efficiency is achieved by driving engine 100 along the operation line.

Referring to FIG. 4 again, when position PSH of shift lever 200 is a "sequential shift (S)" position, the manual shift mode is selected. In the manual shift mode, the shift range can be manually changed within the range of, for example, 1 to 6 by the shift operation of moving shift lever 200 back and forth. In the manual shift mode, the engine rotation speed is controlled in accordance with a selected shift range.

In short, in the manual shift mode, sequential shift control is performed, in which control is performed such that the driving power or the braking force of the hybrid vehicle changes in stages by moving shift lever 200 back and forth. As a result, in the manual shift mode, the deceleration can be changed by changing the shift range during deceleration.

For example, when position PSH of shift lever 200 is the "S" position and when the driver operates shift lever 200 toward the forward part of the vehicle, engine 100, first motor generator 110 and second motor generator 120 are controlled such that engine rotation speed NE decreases like the case where the automatic transmission is upshifted. By way of example, engine rotation speed NE is set to become lower as the selected shift range is higher, i.e., as the number of upshift is larger.

Conversely, when position PSH of shift lever 200 is the "S" position and when the driver operates shift lever 200 toward the backward part of the vehicle during deceleration of the vehicle, engine 100, first motor generator 110 and second motor generator 120 are controlled such that engine rotation speed NE increases like the case where the automatic transmission is downshifted. By way of example, engine rotation speed NE is set to become higher as the selected shift range is lower, i.e., as the number of downshift is larger.

Figure 7:
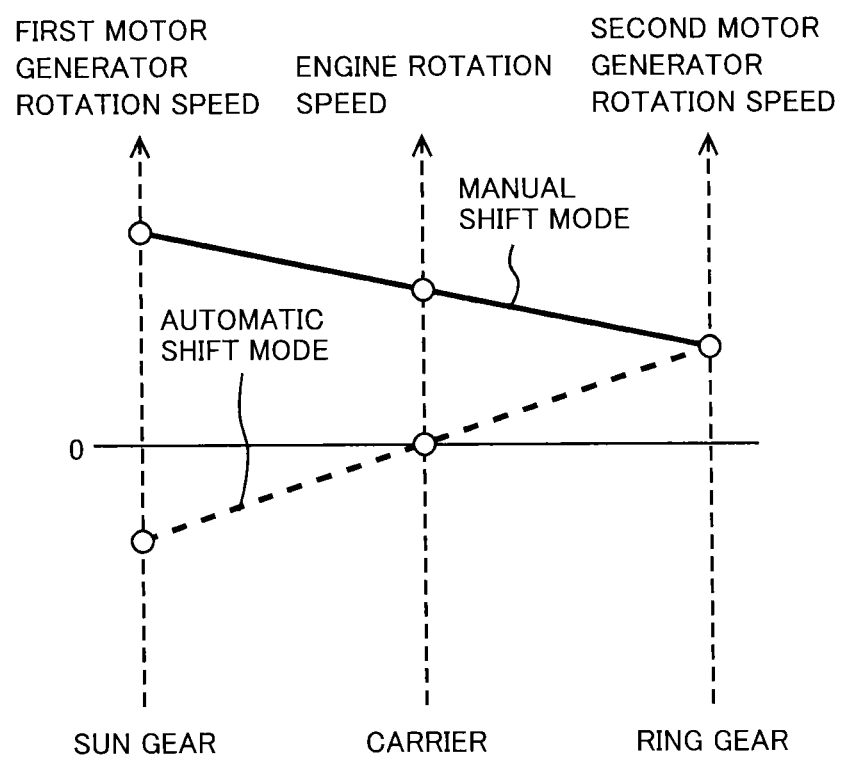
FIG. 7 shows an engine rotation speed NE during deceleration in a manual shift mode and an engine rotation speed NE during deceleration in an automatic shift mode.

More specifically, as shown by a solid line in FIG. 7, assuming that the vehicle speed remains unchanged, engine rotation speed NE is increased by increasing the rotation speed of first motor generator 110. On the other hand, as shown by a broken line in FIG. 7, when the automatic shift mode is selected, engine rotation speed NE is generally zero. In other words, engine 100 is stopped. Therefore, engine rotation speed NE during deceleration is increased when the manual shift mode is selected, as compared with when the automatic shift mode is selected. In addition, in the manual shift mode, engine rotation speed NE is set to become higher and the deceleration is increased as the selected shift range is lower. For example, a higher deceleration is obtained when the shift range is "1" than when the shift range is "5".

The shift range when position PSH of shift lever 200 is moved from the "drive (D)" position to the "sequential shift (S)" position is automatically selected in accordance with the traveling conditions such as the vehicle speed, the amount of operation of accelerator pedal 180 and the amount of operation of the brake pedal. By way of example, the shift range is selected in accordance with a map created in advance by a developer.

In addition, in the present embodiment, the shift range when PM-ECU 174 stops control of the powertrain due to the driver's operation of start switch 178 during travel of the vehicle, and thereafter, PM-ECU 174 resumes control of the powertrain due to the driver's operation of start switch 178 again is controlled in accordance with an elapsed time since PM-ECU 174 stopped control of the powertrain.

Figure 8:
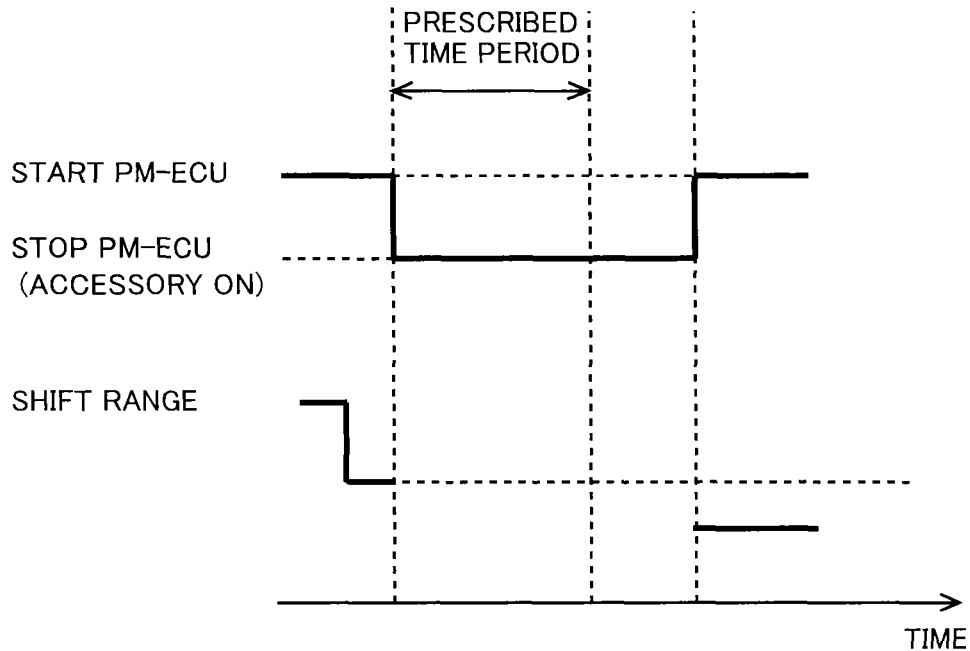
FIG. 8 shows a shift range when an elapsed time since the PM-ECU stopped is longer than a prescribed time period.

More specifically, as shown in FIG. 8, when the elapsed time is longer than or equal to a prescribed time period, PM-ECU 174 selects the shift range in accordance with the traveling conditions such as the vehicle speed, the amount of operation of accelerator pedal 180 and the amount of operation of the brake pedal, like when position PSH of shift lever 200 is moved from the "drive (D)" position to the "sequential shift (S)" position.

Figure 9:
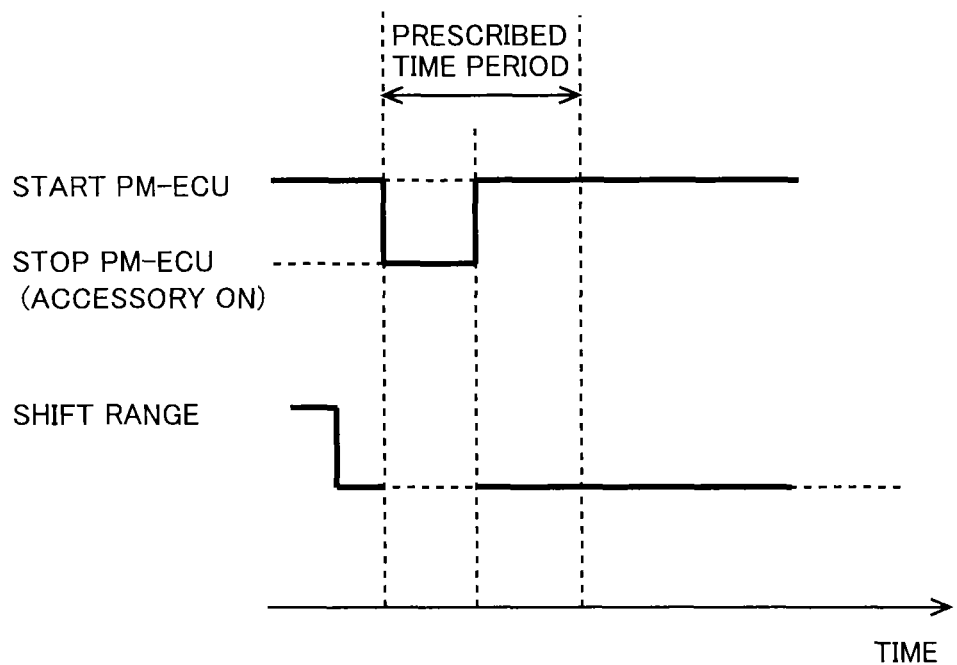
FIG. 9 shows a shift range when the elapsed time since the PM-ECU stopped is shorter than the prescribed time period.

On the other hand, as shown in FIG. 9, when the elapsed time is shorter than the prescribed time period, PM-ECU 174 selects the same shift range as the shift range when PM-ECU 174 stopped control of the powertrain.

Figure 10:
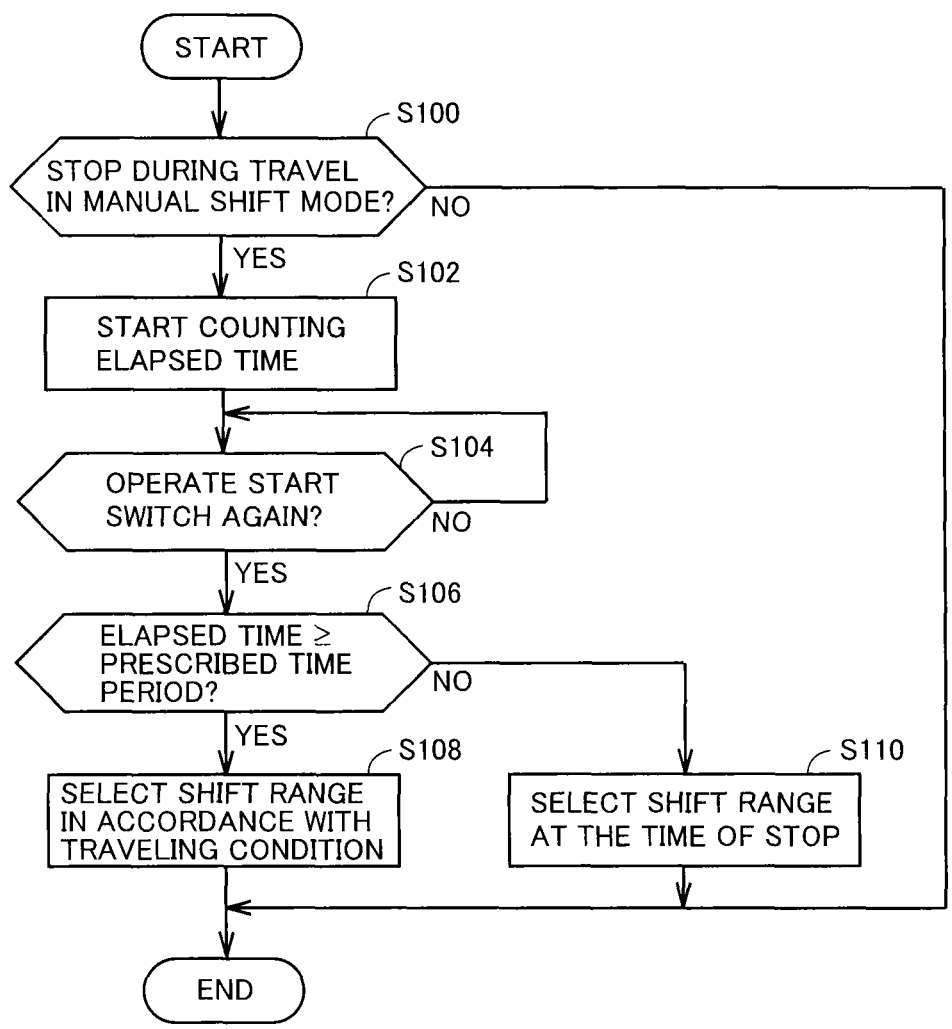
FIG. 10 is a flowchart (No. 1) showing a process executed by the PM-ECU.

A process executed by PM-ECU 174 in the present embodiment will be described with reference to FIG. 10. The process described below may be implemented by software, or may be implemented by hardware, or may be implemented by cooperation of software and hardware.

In step (hereinafter abbreviated as "S") 100, it is determined whether or not PM-ECU 174 has stopped control of the powertrain due to the driver's operation of start switch 178 while the vehicle is traveling and while the manual shift mode is in execution.

If PM-ECU 174 has stopped control of the powertrain while the manual shift mode is in execution (YES in S100), counting of the elapsed time since PM-ECU 174 stopped control of the powertrain is started in S102.

If the driver operates start switch 178 again thereafter (YES in S104), it is determined in S106 whether or not the elapsed time since PM-ECU 174 stopped control of the powertrain is longer than or equal to the prescribed time period.

If the elapsed time since PM-ECU 174 stopped control of the powertrain is longer than or equal to the prescribed time period (YES in S106), PM-ECU 174 selects the shift range in S108 in accordance with the traveling conditions such as the vehicle speed, the amount of operation of accelerator pedal 180 and the amount of operation of the brake pedal, like when position PSH of shift lever 200 is moved from the "drive (D)" position to the "sequential shift (S)" position.

If the elapsed time since PM-ECU 174 stopped control of the powertrain is shorter than the prescribed time period (NO in S106), PM-ECU 174 selects the same shift range as the shift range when PM-ECU 174 stopped control of the powertrain in S110.

As described above, in the present embodiment, the shift range is selected in accordance with the elapsed time since PM-ECU 174 stopped control of the powertrain. Therefore, the shift range can be selected in consideration of whether or not the driver becomes accustomed to the traveling condition after PM-ECU 174 stopped control of the powertrain. Accordingly, if the driver becomes accustomed to the traveling condition after PM-ECU 174 stopped control of the powertrain, the shift range corresponding to the traveling condition can be selected. Conversely, if the driver is not accustomed to the traveling condition after PM-ECU 174 stopped control of the powertrain, the shift range when PM-ECU 174 stopped control of the powertrain can be selected. As a result, the deceleration that meets the driver's expectation can be achieved.

OTHER EMBODIMENT

In addition to the elapsed time since PM-ECU 174 stopped control of the powertrain, the shift range may be selected in consideration of the operation of brake pedal 190. Specifically, when the elapsed time since PM-ECU 174 stopped control of the powertrain is longer than or equal to the prescribed time period and when brake pedal 190 is not operated, the shift range is selected in accordance with the traveling conditions such as the vehicle speed, the amount of operation of accelerator pedal 180 and the amount of operation of the brake pedal, like when position PSH of shift lever 200 is moved from the "drive (D)" position to the "sequential shift (S)" position. On the other hand, when the elapsed time is longer than or equal to the prescribed time period and when brake pedal 190 is operated, the shift range lower than the shift range when brake pedal 190 is not operated, i.e., the shift range that allows a higher deceleration, is selected.

Figure 11:
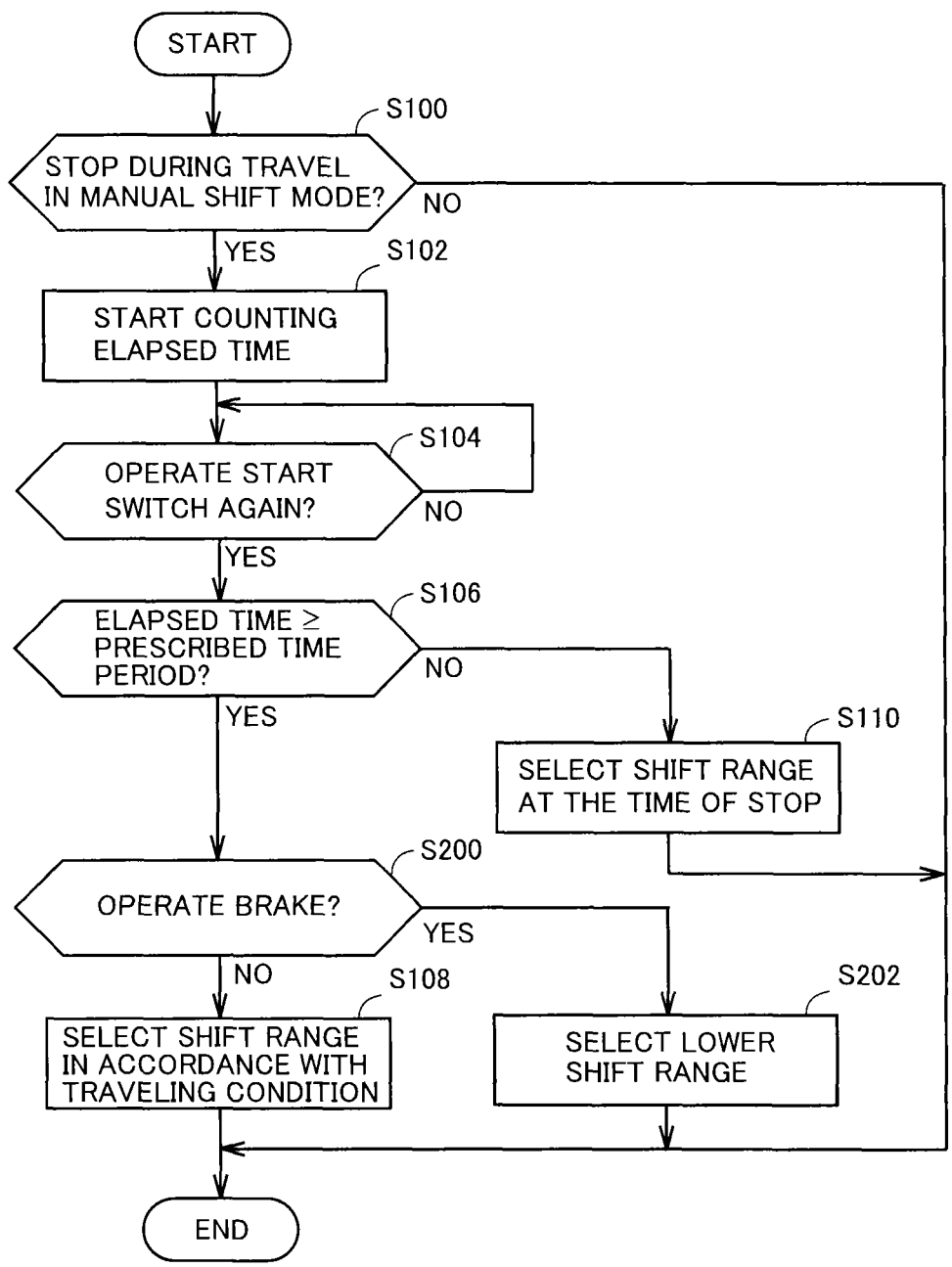
FIG. 11 is a flowchart (No. 2) showing a process executed by the PM-ECU.

A process executed by PM-ECU 174 in the present embodiment will be described with reference to FIG. 11. The process described below may be implemented by software, or may be implemented by hardware, or may be implemented by cooperation of software and hardware. The same steps as the steps described with reference to FIG. 10 are denoted by the same reference numerals, and description thereof will not be repeated here.

If the elapsed time since PM-ECU 174 stopped control of the powertrain is longer than or equal to the prescribed time period (YES in S106), it is determined in S200 whether or not brake pedal 190 is operated. If brake pedal 190 is not operated (NO in S200), the shift range is selected in accordance with the traveling conditions as described above (S108).

On the other hand, if brake pedal 190 is operated (YES in S200), the shift range that allows the higher deceleration than the deceleration when brake pedal 190 is not operated is selected in S202. For example, assuming that the vehicle speed is the same, the lower shift range is selected when brake pedal 190 is operated than when brake pedal 190 is not operated.

As described above, in the present embodiment, whether or not brake pedal 190 is operated is taken into consideration. Thus, the deceleration that complies with the driver's intention to request a high deceleration can be achieved.

It should be understood that the embodiments disclosed herein are illustrative and not limitative in any respect. The scope of the present invention is defined by the terms of the claims, rather than the description above, and is intended to include any modifications within the scope and meaning equivalent to the terms of the claims.

REFERENCE SIGNS LIST

100 engine; 110 first motor generator; 120 second motor generator; 130 power split device; 140 speed reducer; 150 battery; 160 front wheel; 170 EFI-ECU; 172 MG-ECU; 174 PM-ECU; 176 power supply ECU; 178 start switch; 180 accelerator pedal; 182 accelerator opening degree sensor; 190 brake pedal; 200 shift lever; 202 position sensor.

The invention claimed is:

1. A vehicle, comprising:
   a powertrain to change a deceleration by changing a shift range;
   a control device configured to control the powertrain of the vehicle; and
   a switch operated by a driver to start and stop the control device,
   the control device being configured to:
      stop control of the powertrain when the switch is operated during travel of the vehicle, and when the control device stops control of the powertrain and thereafter the switch is operated again during travel of the vehicle:
         (i) select a shift range in accordance with a traveling condition of the vehicle when the elapsed time is longer than or equal to a prescribed time period, and
         (ii) select the same shift range as the shift range when the control device stopped control of the powertrain when the elapsed time is shorter than the prescribed time period.

2. The vehicle according to claim 1, wherein
   when the elapsed time is longer than or equal to the prescribed time period,
      (a) the control device is configured to select a shift range in accordance with a traveling condition of the vehicle when a brake pedal is not operated,
      (b) the control device is configured to select a shift range that allows a higher deceleration than a deceleration when the brake pedal is not operated when the brake pedal is operated, and when the elapsed time is shorter than the prescribed time period,
   the control device is configured to select the same shift range as the shift range when the control device stopped control of the powertrain.

3. The vehicle according to claim 1, wherein
   when the control device stops control of the powertrain due to operation of the switch during travel of the vehicle, in a state where the powertrain is controlled in a manual shift mode in which the shift range can be manually changed,
   the control device is configured to control the shift range in accordance with the elapsed time when the switch is operated again during travel of the vehicle.

4. A control system for a vehicle capable of changing a deceleration by changing a shift range, the control system comprising:
   processing circuitry configured to control a powertrain of the vehicle; and
   a switch operated by a driver to start and stop the processing circuitry,
   the processing circuitry being configured to:
      stop control of the powertrain when the switch is operated during travel of the vehicle, and when the processing circuitry stops control of the powertrain and thereafter the switch is operated again during travel of the vehicle:
         (i) select a shift range in accordance with a traveling condition of the vehicle when the elapsed time is longer than or equal to a prescribed time period, and
         (ii) select the same shift range as the shift range when the processing circuitry stopped control of the powertrain when the elapsed time is shorter than the prescribed time period.

5. The control system for a vehicle according to claim 4, wherein when the elapsed time is longer than or equal to the prescribed time period,
   (a) the processing circuitry is configured to select a shift range in accordance with a traveling condition of the vehicle when a brake pedal is not operated,
   (b) the processing circuitry is configured to select a shift range that allows a higher deceleration than a deceleration when the brake pedal is not operated when the brake pedal is operated, and
   when the elapsed time is shorter than the prescribed time period,
      the processing circuitry is configured to select the same shift range as the shift range when the processing circuitry stopped control of the powertrain.

6. The control system for a vehicle according to claim 4, wherein
when the processing circuitry stops control of the powertrain due to operation of the switch during travel of the vehicle, in a state where the powertrain is controlled in a manual shift mode in which the shift range can be manually changed,
the processing circuitry is configured to control the shift range in accordance with the elapsed time when the switch is operated again during travel of the vehicle.

* * * * *